(12) United States Patent
Itonori

(10) Patent No.: US 11,494,923 B2
(45) Date of Patent: Nov. 8, 2022

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventor: Katsuhiko Itonori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 379 days.

(21) Appl. No.: 16/550,273

(22) Filed: Aug. 25, 2019

(65) Prior Publication Data

US 2020/0250841 A1  Aug. 6, 2020

(30) Foreign Application Priority Data

Jan. 31, 2019 (JP) .............................. JP2019-016250

(51) Int. Cl.
| | |
|---|---|
| G06K 9/00 | (2022.01) |
| G06F 17/00 | (2019.01) |
| G06T 7/33 | (2017.01) |
| G06V 30/414 | (2022.01) |
| G06V 30/10 | (2022.01) |

(52) U.S. Cl.
CPC .............. *G06T 7/33* (2017.01); *G06V 30/414* (2022.01); *G06T 2207/30176* (2013.01); *G06V 30/10* (2022.01)

(58) Field of Classification Search
CPC ......... G06K 9/00; G06V 30/154; G06F 17/00
USPC ........ 382/100, 103, 106, 112–113, 137, 162, 382/168, 173, 182–204, 232, 254, 274, 382/276, 286–297, 305, 321, 229, 290; 715/204, 233

See application file for complete search history.

(56) References Cited

U.S. PATENT DOCUMENTS

| | | | | |
|---|---|---|---|---|
| 5,892,842 | A * | 4/1999 | Bloomberg | ............ G06V 10/24 382/173 |
| 6,377,704 | B1 * | 4/2002 | Cooperman | ......... G06V 30/416 715/204 |
| 7,194,144 | B1 | 3/2007 | Sakai et al. | |
| 8,131,087 | B2 | 3/2012 | Takebe et al. | |
| 2005/0259866 | A1 * | 11/2005 | Jacobs | ................. G06V 30/153 382/229 |
| 2013/0343658 | A1 * | 12/2013 | Dejean | ................. G06V 30/414 382/203 |

(Continued)

FOREIGN PATENT DOCUMENTS

| | | |
|---|---|---|
| JP | H05210672 | 8/1993 |
| JP | H0736869 | 2/1995 |

(Continued)

OTHER PUBLICATIONS

"Office Action of Japan Counterpart Application" with English translation thereof, dated Aug. 23, 2022, p. 1-p. 9.

*Primary Examiner* — Seyed H Azarian
(74) *Attorney, Agent, or Firm* — JCIPRNET

(57) ABSTRACT

An information processing device is provided with an acquisition unit, a detection unit, and a combination unit. The acquisition unit performs layout analysis on image information and acquires multiple regions. The detection unit detects a feature indicating that regions are continuous from each of the multiple regions acquired by the acquisition unit. The combination unit combines adjacent regions in a case in which the feature is detected by the detection unit.

15 Claims, 13 Drawing Sheets

(56) References Cited

U.S. PATENT DOCUMENTS

2019/0228220 A1* 7/2019 Matsumoto ............ G06V 10/22
2020/0364452 A1* 11/2020 Pellinen .................. G06F 40/30

FOREIGN PATENT DOCUMENTS

| JP | H09212580 | 8/1997 |
| JP | 2000278514 | 10/2000 |
| JP | 2001052112 | 2/2001 |
| JP | 2017204270 | 11/2017 |
| WO | 2007080642 | 7/2007 |

* cited by examiner

- Low consumption current : Idd=1.0 μA(Max.)(Top=25℃)
- Wide power voltage range : 2.0 V TO 5.5 V
- Wide input voltage range : Vih=5.5 V(Max.)(Vdd=0 TO 5.5 V)
- High speed : Tpd=2 ns(Typ.) (Vdd=5.0 V)
- Small package : SOT-25, SSOT-25(SC-88A)

FIG. 5

- Low consumption current : Idd=1.0 μA(Max.)(Top=25°C)
- Wide power voltage range : 2.0 V TO 5.5 V
- Wide input voltage range : Vih=5.5 V(Max.)(Vdd=0 TO 5.5 V)
- High speed : Tpd=2 ns(Typ.) (Vdd=5.0 V)
- Small package : SOT-25, SSOT-25(SC-88A)

FIG. 6

R11:
- Low consumption current
- Wide power voltage range
- Wide input voltage range
- High speed
- Small package R12:
- Idd=1.0 μA(Max.)(Top=25°C)
- 2.0 V TO 5.5 V
- Vih=5.5 V(Max.)(Vdd=0 TO 5.5 V)
- Tpd=2 ns(Typ.) (Vdd=5.0 V)
- SOT-25, SSOT-25(SC-88A)

FIG. 7

R13:
- Low consumption current : Idd=1.0 μA(Max.)(Top=25°C)
- Wide power voltage range : 2.0 V TO 5.5 V
- Wide input voltage range : Vih=5.5 V(Max.)(Vdd=0 TO 5.5 V)
- High speed : Tpd=2 ns(Typ.) (Vdd=5.0 V)
- Small package : SOT-25, SSOT-25(SC-88A)

FIG. 9A

Power supply voltage (Vcc) .................................................. 7.0 V
Operating temperature (TA) .......... WA-LS: −55 to +125°C
                                      WP90224L5: 0 to 70°C
                              WA-LSD, WP91398L2: −40 to +85°C
Storage temperature (Tstg) .............................. −65 to +150°C

FIG. 9B

Power supply voltage (Vcc) .................................................. 7.0 V
Operating temperature (TA) .......... WA-LS: −55 to +125°C
                                      WP90224L5: 0 to 70°C
                              WA-LSD, WP91398L2: −40 to +85°C
Storage temperature (Tstg) .............................. −65 to +150°C

FIG. 12

| | |
|---|---|
| Power supply voltage (Vcc) | 7.0 V |
| Operating temperature (TA) | WA-LS: −55 to +125°C |
| | WP902241S: 0 to 70°C |
| | WP91398L2: −40 to +85°C |
| | WA-LSD, WA-LSD: |
| Storage temperature (Tstg) | −65 to +150°C |

| | |
|---|---|
| Power supply voltage (Vcc)............................................... | 7.0 V |
| Operating temperature (TA).............................. WA-LS: | −55 to +125°C |
| WP90224L5: | 0 to 70°C |
| WA-LSD, WP91398L2: | −40 to +85°C |
| Storage temperature (Tstg)................................................ | −65 to +150°C |

R36, 52

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-016250 filed Jan. 31, 2019.

BACKGROUND

(i) Technical Field

The present disclosure relates to an information processing device and a non-transitory computer readable medium.

(ii) Related Art

For example, Japanese Unexamined Patent Application Publication No. 2001-52112 describes a recognition processing method that recognizes information in an original image. The method includes identifying a region in an original image, re-identifying the region in the original image according to information obtained from a target to be recognized for every region defined by identification, and recognizing the target to be recognized in every re-identified region.

SUMMARY

Meanwhile, in the case of combining text regions, although technology that combines using the center coordinates and heights of text regions exists, in this case, text regions with nearby center coordinates and also little difference in line height are combined. In other words, because text regions not having nearby center coordinates are not combined, the desired combination result may not be obtained in some cases.

Aspects of non-limiting embodiments of the present disclosure relate to obtaining a desired combination result compared to the case of combining multiple text regions by using the relationship of the center coordinates of the text regions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device provided with an acquisition unit, a detection unit, and a combination unit. The acquisition unit performs layout analysis on image information and acquires multiple regions. The detection unit detects a feature indicating that regions are continuous from each of the multiple regions acquired by the acquisition unit. The combination unit combines adjacent regions in a case in which the feature is detected by the detection unit.

BRIEF DESCRIPTION OF THE DRAWINGS

Exemplary embodiments of the present disclosure will be described in detail based on the following figures, wherein:

FIG. 5 is a diagram illustrating one example of an input image according to the first exemplary embodiment;

FIG. 6 is a diagram illustrating one example of multiple text regions obtained as a layout analysis result according to the first exemplary embodiment;

FIG. 7 is a diagram illustrating one example of a text region obtained as a combination result according to the first exemplary embodiment;

FIG. 9A is a diagram illustrating another example of an input image;

FIG. 9B is a diagram illustrating another example of multiple text regions;

FIG. 12 is a diagram illustrating one example of an input image according to the second exemplary embodiment;

FIG. 14 is a diagram illustrating one example of a text region obtained as a combination result according to the second exemplary embodiment.

DETAILED DESCRIPTION

Hereinafter, exemplary embodiments for carrying out the present disclosure will be described in detail and with reference to the drawings.

First Exemplary Embodiment

Figure 1:
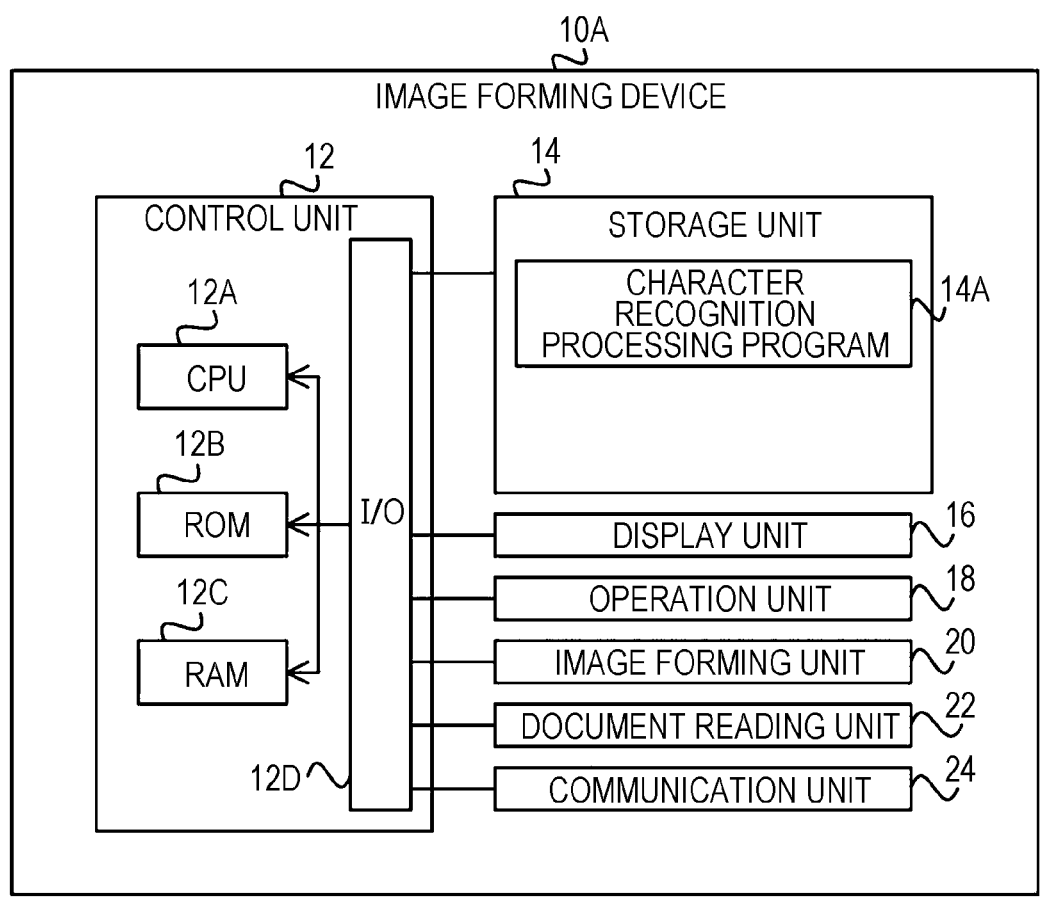
FIG. 1 is a block diagram illustrating an example of an electrical configuration of an image forming device according to the first exemplary embodiment.

FIG. 1 is a block diagram illustrating one example of an electrical configuration of an image forming device 10A according to the first exemplary embodiment. As illustrated in FIG. 1, the image forming device 10A according to the present exemplary embodiment is provided with a controller 12, storage 14, a display 16, an operating unit 18, an image forming unit 20, a document reading unit 22, and a communication unit 24.

Note that the image forming device 10A is one example of an information processing device. Besides the image forming device 10A, the information processing device may also be applied to devices such as a personal computer (PC), a smartphone, or a tablet, for example.

The controller 12 is provided with a central processing unit (CPU) 12A, read-only memory (ROM) 12B, random access memory (RAM) 12C, and an input/output (I/O) interface 12D. These components are interconnected via a bus.

Each functional unit, including the storage 14, the display 16, the operating unit 18, the image forming unit 20, the document reading unit 22, and the communication unit 24, is connected to the I/O 12D. Each of these functional units is capable of bidirectional communication with the CPU 12A via the I/O 12D.

The controller 12 may be configured as a sub-controller that controls a subset of operations of the image forming device 10A, or may be configured as a main controller that controls all operations of the image forming device 10A. An integrated circuit such as a large-scale integration (LSI) chip or an integrated circuit (IC) chipset, for example, is used for some or all of the blocks of the controller 12. A discrete circuit may be used for each of the above blocks, or a circuit integrating some or all of the above blocks may be used. The above blocks may be provided together as a single body, or some blocks may be provided separately. Also, a part of each of the above blocks may be provided separately. The integration of the controller 12 is not limited to LSI, and a dedicated circuit or a general-purpose processor may also be used.

For the storage 14, a hard disk drive (HDD), a solid-state drive (SSD), flash memory, or the like is used, for example. The storage 14 stores a character recognition processing program 14A for realizing a character recognition function according to the present exemplary embodiment. Note that the character recognition processing program 14A may also be stored in the ROM 12B.

The character recognition processing program 14A may be preinstalled in the image forming device 10A, for example. The character recognition processing program 14A may also be realized by being stored on a non-volatile storage medium or distributed over a network, and appropriately installed in the image forming device 10A. Note that anticipated examples of the non-volatile storage medium include a Compact Disc-Read-Only Memory (CD-ROM), a magneto-optical disc, an HDD, a Digital Versatile Disc-Read-Only Memory (DVD-ROM), flash memory, a memory card, and the like.

For the display 16, for example, a liquid crystal display (LCD), an organic electroluminescence (EL) display, or the like is used. The display 16 includes an integrated touch panel. On the operating unit 18, various operating keys such as a keypad and a Start key are provided. The display 16 and the operating unit 18 accept various instructions from a user of the image forming device 10A. The various instructions include, for example, an instruction to start reading a document, an instruction to start copying a document, and the like. The display 16 displays various information such as the results of processes executed in accordance with instructions received from the user, notifications about processes, and the like.

The document reading unit 22 takes in one page at a time of a document placed on a paper feed tray of an automatic document feeder (not illustrated) provided on the top of the image forming device 10A, and optically reads the taken-in document to obtain image information. Alternatively, the document reading unit 22 optically reads a document placed on a document bed such as a platen glass to obtain image information.

The image forming unit 20 forms, on a recording medium such as paper, an image based on image information obtained by the reading by the document reading unit 22, or image information obtained from an external PC or the like connected via a network. Note that although the present exemplary embodiment is described by taking an electrophotographic system as an example of the system of forming images, another system, such as an inkjet system, may also be adopted.

In the case in which the system of forming images is an electrophotographic system, the image forming unit 20 includes a photoreceptor drum, a charger, an exposure unit, a developer, a transfer unit, and a fuser. The charger applies a voltage to the photoreceptor drum to charge the surface of the photoreceptor drum. The exposure unit forms an electrostatic latent image on the photoreceptor drum by exposing the photoreceptor drum charged by the charger with light corresponding to the image information. The developer forms a toner image on the photoreceptor drum by developing with toner the electrostatic latent image formed on the photoreceptor drum. The transfer unit transfers the toner image formed on the photoreceptor drum onto a recording medium. The fuser fuses the transferred toner image to the recording medium with heat and pressure.

The communication unit 24 is connected to a network such as the Internet, a local area network (LAN), or a wide area network (WAN), and is capable of communicating with an external PC and the like over the network.

The image forming device 10A according to the present exemplary embodiment is provided with an optical character recognition (OCR) function, and is capable of converting an image included in image information into one or more character codes by performing character recognition.

Figures 2A, 2B:
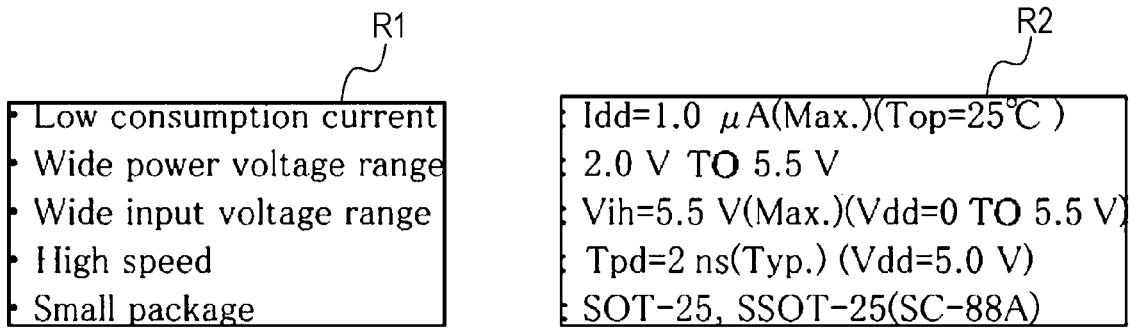
FIG. 2A is a diagram illustrating one example of an input image.
FIG. 2B is a diagram illustrating one example of multiple text regions.

Meanwhile, as illustrated in FIGS. 2A and 2B as an example, when combining multiple text regions by using the relationship of the center coordinates of the multiple text regions, the desired combination result may not be obtained in some cases.

FIG. 2A is a diagram illustrating one example of an input image. FIG. 2B is a diagram illustrating one example of multiple text regions.

The input image illustrated in FIG. 2A is an image containing five text lines, and if layout analysis is performed on this input image, a layout analysis result including multiple text regions R1 and R2 is obtained, as illustrated in FIG. 2B.

Additionally, because there is a delimiter character ":" at the beginning of each text line in the text region R2, it is conceivable that the text region R1 and the text region R2 were originally a continuous text region. Consequently, it is desirable for the these text regions R1 and R2 to be combined into a single text region, but depending on the relationship of the center coordinates, the text regions R1 and R2 may not be combined in some cases.

Figure 3:
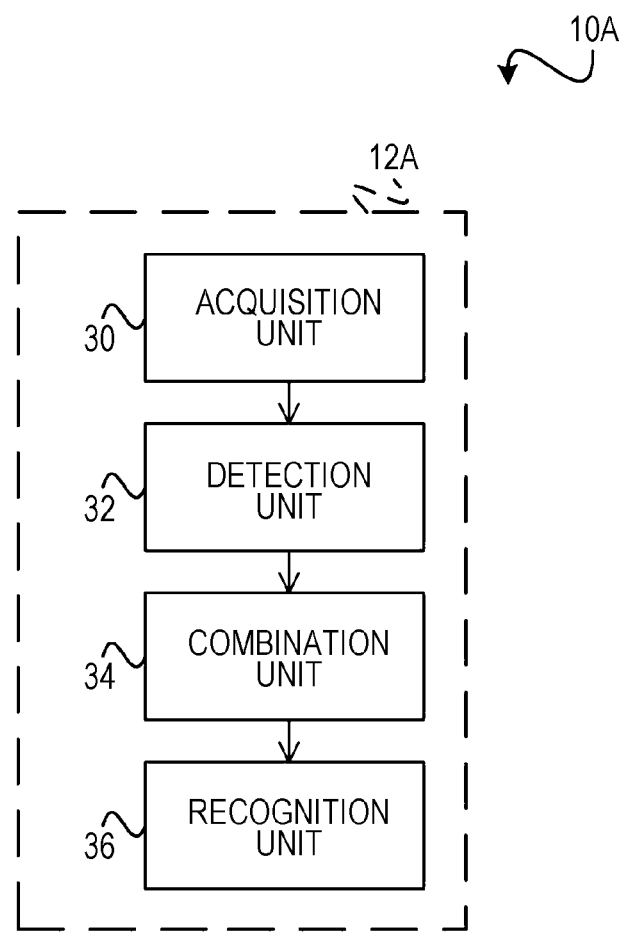
FIG. 3 is a block diagram illustrating an example of a functional configuration of the image forming device according to the first exemplary embodiment.

For this reason, by loading the character recognition processing program 14A stored in the storage 14 into the RAM 12C, and executing the character recognition processing program 14A, the CPU 12A of the image forming device 10A according to the present exemplary embodiment functions as each component illustrated in FIG. 3.

FIG. 3 is a block diagram illustrating an example of a functional configuration of the image forming device 10A according to the first exemplary embodiment. As illustrated in FIG. 3, the CPU 12A of the image forming device 10A according to the present exemplary embodiment functions as an acquisition unit 30, a detection unit 32, a combination unit 34, and a recognition unit 36.

The acquisition unit 30 according to the present exemplary embodiment performs layout analysis on an input image, and acquires multiple regions. Layout analysis refers to a process performed as preprocessing for character recognition, and is a process that distinguishes and acquires a text region containing character candidates and an image region other than the text region from features such as the consecutive state of black pixels and the spacing of blobs of black pixels. By such layout analysis, layout information indicating attributes such as the position and size of each region is acquired. Note that the input image may be image information acquired by reading with the document reading unit 22, or image information obtained from an external PC or the like over a network.

The detection unit 32 according to the present exemplary embodiment detects features indicating that regions are continuous from each of the multiple regions acquired by the acquisition unit 30. In the case of the present exemplary embodiment, it is sufficient for at least a text region to be included among the multiple regions, but a text region and an image region may be included among the multiple regions. Also, as a feature indicating that regions are continuous, a specific image positioned at the beginning or the end of a text line contained in a text region is applied. The specific image referred to herein is an image expressing a predetermined delimiter character as one example. Note that examples of delimiter characters include ":", ";", "=", "-", "→", and the like. Delimiter characters are a type of punctuation mark, and are used to join character strings to each other.

In the case in which features are detected by the detection unit 32, the combination unit 34 according to the present exemplary embodiment combines adjacent regions. Specifically, in the case in which a delimiter character, which is one example of a feature, is positioned at the beginning of a text line, the combination unit 34 combines the text region containing the delimiter character with the text region adjacent to the left edge of the text region containing the delimiter character. On the other hand, in the case in which a delimiter character is positioned at the end of a text line, the combination unit 34 combines the text region containing the delimiter character with the text region adjacent to the right edge of the text region containing the delimiter character.

The recognition unit 36 according to the present exemplary embodiment performs a character recognition process on the multiple text regions, including the combined text region obtained by the combination unit 34, and outputs the obtained character recognition result to the storage 14 as one example. Note that for the character recognition process, a known method such as feature matching or pattern matching is used as one example.

Figure 4:
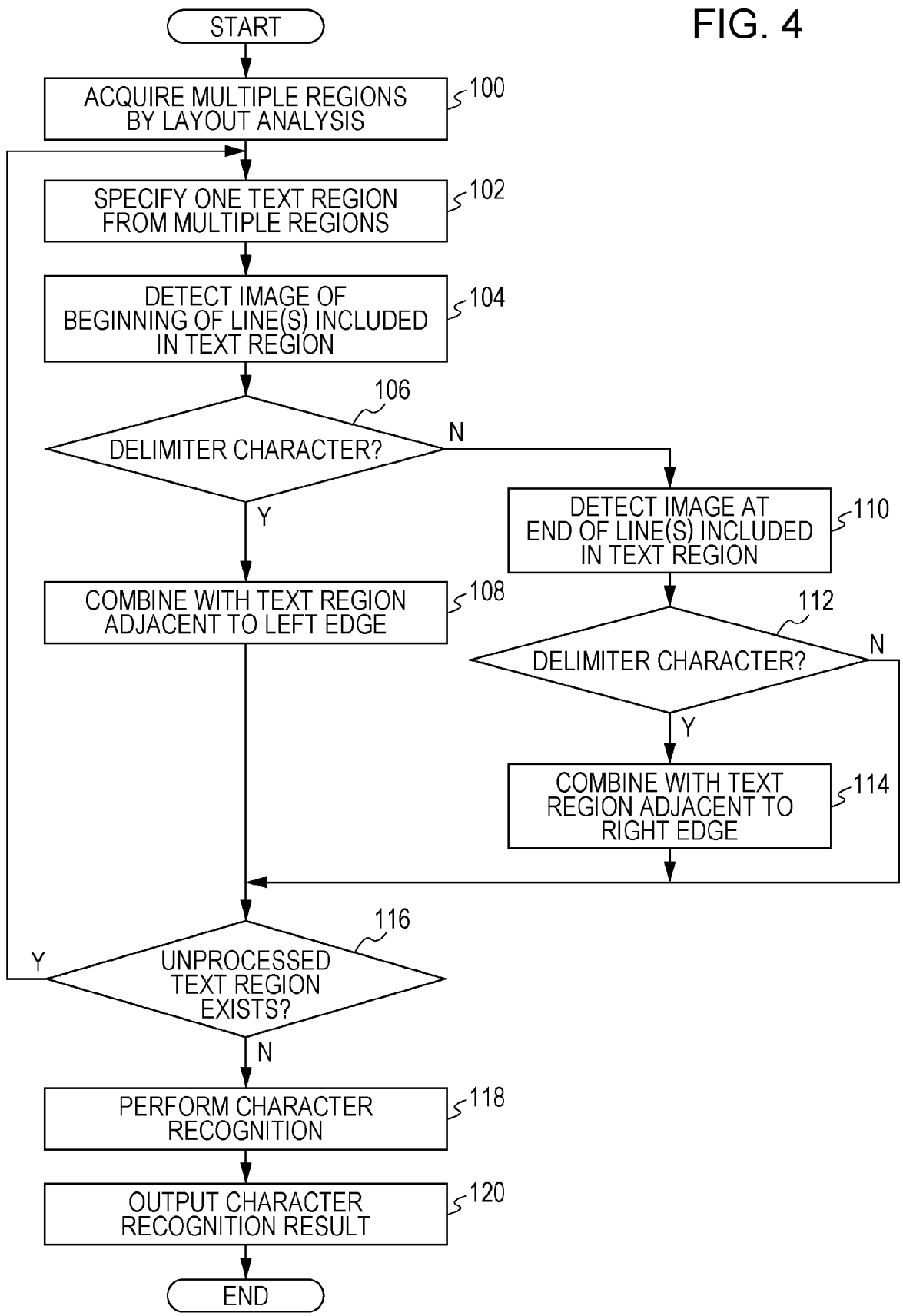
FIG. 4 is a flowchart illustrating one example of the flow of a process by a character recognition processing program according to the first exemplary embodiment.

Next, FIG. 4 will be referenced to describe the action of the image forming device 10A according to the first exemplary embodiment.

FIG. 4 is a flowchart illustrating one example of the flow of a process by the character recognition processing program 14A according to the first exemplary embodiment.

First, if the image forming device 10A is instructed to launch the character recognition processing program 14A, each of the following steps is executed.

In step 100 of FIG. 4, the acquisition unit 30 acquires multiple regions by performing layout analysis on an input image. As one example, layout analysis is performed on an input image 50 illustrated in FIG. 5, and a layout analysis result including multiple text regions R11 and R12 illustrated in FIG. 6 is obtained.

FIG. 5 is a diagram illustrating one example of the input image 50 according to the first exemplary embodiment. FIG. 6 is a diagram illustrating one example of the multiple text regions R11 and R12 obtained as a layout analysis result according to the first exemplary embodiment.

In step 102, the detection unit 32 specifies one text region from among the multiple regions acquired in step 100. As one example, the single text region R12 is specified from the multiple text regions R11 and R12 illustrated in FIG. 6.

In step 104, the detection unit 32 detects an image of the beginning of one or more text lines contained in the text region specified in step 102. As one example, an image 50A of the beginning of the text lines is detected from the text region R12 illustrated in FIG. 6.

In step 106, the detection unit 32 determines whether or not the image of the beginning detected in step 104 is a delimiter character. In the case of determining that the image of the beginning is a delimiter character (in the case of a positive determination), the flow proceeds to step 108, whereas in the case of determining that the image of the beginning is not a delimiter character (in the case of a negative determination), the flow proceeds to step 110. As one example, the image 50A illustrated in FIG. 6 is determined to be the delimiter character ":". For the determination of a delimiter character, a known method such as feature matching or pattern matching is used as one example. For example, features (such as the consecutive state of black pixels and the spacing of blobs of black pixels) of predetermined delimiter characters are derived to create a dictionary of features, and the created dictionary is stored in the storage 14. Subsequently, features of the image of the beginning of one or more text lines detected from a text region are derived and compared to features in the dictionary to thereby determine a delimiter character.

In step 108, the combination unit 34 combines the text region containing the delimiter character with the text region adjacent to the left edge of the text region containing the delimiter character, and the flow proceeds to step 116. As one example, the text region R12 and the text region R11 illustrated in FIG. 6 are combined, and a text region R13 illustrated in FIG. 7 is obtained as the combination result.

FIG. 7 is a diagram illustrating one example of the text region R13 obtained as a combination result according to the first exemplary embodiment.

Note that in the case in which an image region containing an image of something other than a character candidate exists between the text region containing the delimiter character and the text region positioned to the left of the text region containing the delimiter character, the text region positioned to the left is excluded from the combination target. Also, in the case in which the distance between the text region containing the delimiter character and the text region positioned to the left of the text region containing the delimiter character is a certain distance or greater (for example, 10 characters or greater), the text region positioned to the left is excluded from the combination target.

On the other hand, in step 110, the detection unit 32 detects an image of the end of one or more test lines contained in the text region specified in step 102. Note that steps 104 to 108 and steps 110 to 114 may be interchanged in the processing sequence.

In step 112, the detection unit 32 determines whether or not the image of the end detected in step 110 is a delimiter character. In the case of determining that the image of the end is a delimiter character (in the case of a positive determination), the flow proceeds to step 114, whereas in the case of determining that the image of the end is not a delimiter character (in the case of a negative determination), the flow proceeds to step 116.

In step 114, the combination unit 34 combines the text region containing the delimiter character with the text region adjacent to the right edge of the text region containing the delimiter character, and the flow proceeds to step 116. Note that in the case in which an image region containing an image of something other than a character candidate exists between the text region containing the delimiter character and the text region positioned to the right of the text region containing the delimiter character, the text region positioned to the right is excluded from the combination target. Also, in the case in which the distance between the text region containing the delimiter character and the text region positioned to the right of the text region containing the delimiter character is a certain distance or greater (for example, 10 characters or greater), the text region positioned to the right is excluded from the combination target.

In step 116, the combination unit 34 determines whether or not a text region not yet processed by the combination process exists. In the case of determining that an unprocessed text region exists (in the case of a positive determination), the flow returns to step 102 and the process is repeated, whereas in the case of determining that an unprocessed text region does not exist (in the case of a negative determination), the flow proceeds to step 118.

In step 118, the recognition unit 36 performs the character recognition process on multiple text regions, including the text region obtained by the above combination process, and acquires a character recognition result.

In step 120, the recognition unit 36 outputs the character recognition result obtained in step 118 to the storage 14 as one example, and ends the series of processes by the character recognition processing program 14A.

Figure 8:
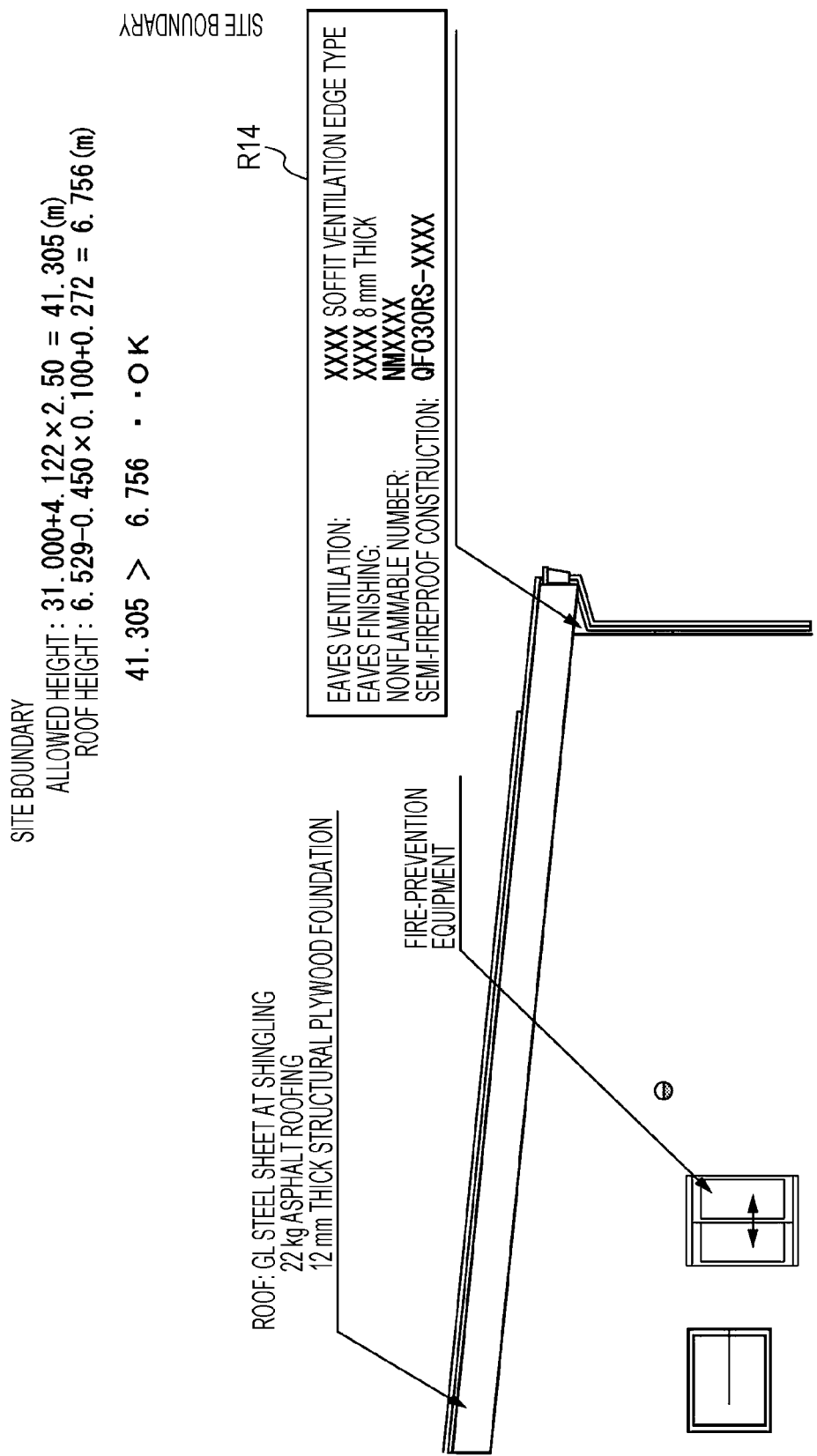
FIG. 8 is a diagram illustrating one example of an image to which the combination process according to the first exemplary embodiment is applied.

FIG. 8 is a diagram illustrating one example of an image to which the combination process according to the first exemplary embodiment is applied. In the case of the image illustrated in FIG. 8, a layout analysis result including a text region R14 is obtained.

In FIG. 8, the delimiter character ":" is contained in the text region containing "Eaves ventilation:, Eaves finishing:, Nonflammable number:, Semi-fireproof construction:". For this reason, the text region containing "XXXX soffit ventilation edge type, XXXX 8 mm thick, NMXXXX, QF030RS-XXXX" adjacent to the right edge of the text region containing the delimiter character is combined with the text region containing the delimiter character and treated as the text region R14.

Note that although the above describes the case of using an image expressing a delimiter character as a feature indicating that text regions are continuous, a character code expressing a delimiter character may also be used as the feature. In this case, the detection unit 32 detects a character code expressing a delimiter character by determining whether or not a character code obtained by performing character recognition on a specific image positioned at the beginning or the end of one or more text lines contained in a text region is a code expressing a predetermined delimiter character. The specific image is an image expressing a delimiter character, and the character recognition process is performed by the recognition unit 36. Also, it is beneficial to store a code table to use for character recognition in the storage 14.

Subsequently, in the case in which a character code expressing a delimiter character is positioned at the beginning of the one or more text lines, the combination unit 34 combines the text region containing the character code with the text region adjacent to the left edge of the text region containing the delimiter character. On the other hand, in the case in which a character code expressing a delimiter character is positioned at the end of the one or more text lines, the combination unit 34 combines the text region containing the character code with the text region adjacent to the right edge of the text region containing the delimiter character.

According to the present exemplary embodiment, a delimiter character contained in a text region is applied as a feature indicating that text regions are continuous. For this reason, a desired combination result is obtained from multiple text regions.

Second Exemplary Embodiment

The first exemplary embodiment above describes a case of applying a delimiter character contained in a text region as a feature indicating that text regions are continuous. The present exemplary embodiment describes a case of applying a leader symbol contained in an image region as a feature indicating that text regions are continuous.

As described above, in the case of combining multiple text regions by using the relationship of the center coordinates of the multiple text regions, the desired combination result may not be obtained in some cases. This point will be described with reference to FIGS. 9A and 9B.

FIG. 9A is a diagram illustrating another example of an input image. FIG. 9B is a diagram illustrating another example of multiple text regions.

The input image illustrated in FIG. 9A is an image containing five text lines, and if layout analysis is performed on this input image, a layout analysis result including multiple text regions R21, R22, R23, and R24 is obtained, as illustrated in FIG. 9B.

Additionally, because the leader symbol " . . . " exists between the text regions R21, R22, R23 and the text region R24, it is conceivable that the text region R21, the text region R22, the text region R23, and the text region R24 were originally a continuous text region. Consequently, it is desirable for these text regions R21, R22, R23, and R24 to be combined into a single text region, but depending on the relationship of the center coordinates, the text regions may not be combined in some cases.

Figure 10:
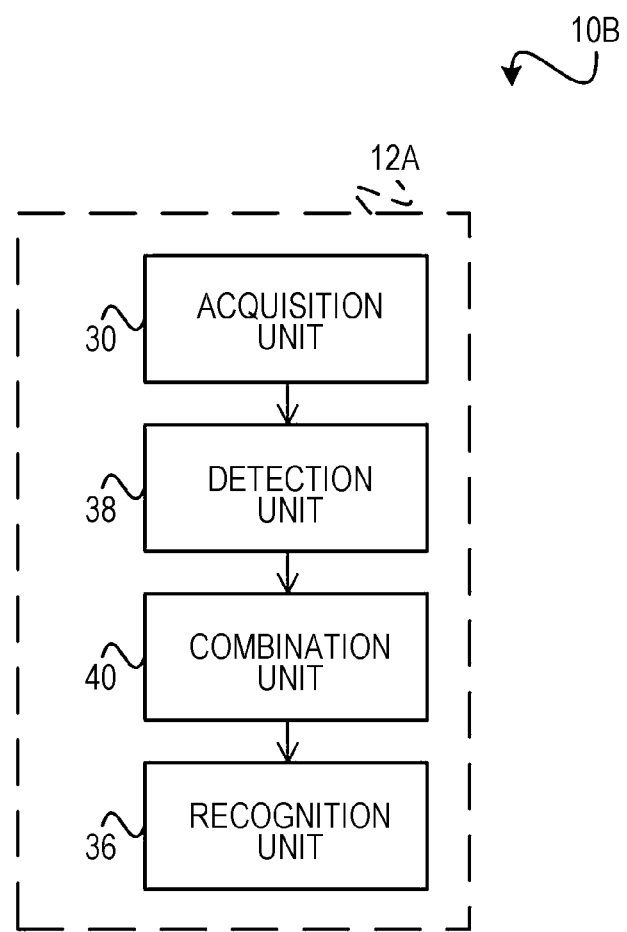
FIG. 10 is a block diagram illustrating one example of a functional configuration of an image forming device according to a second exemplary embodiment.

For this reason, by loading the character recognition processing program 14A stored in the storage 14 into the RAM 12C, and executing the character recognition processing program 14A, the CPU 12A of an image forming device 10B according to the present exemplary embodiment functions as each component illustrated in FIG. 10.

FIG. 10 is a block diagram illustrating an example of a functional configuration of the image forming device 10B according to the second exemplary embodiment. As illustrated in FIG. 10, the CPU 12A of the image forming device 10B according to the present exemplary embodiment functions as an acquisition unit 30, a detection unit 38, a combination unit 40, and a recognition unit 36. Note that component elements having the same function as the image forming device 10A illustrated in the first exemplary embodiment are denoted with the same signs, and a repeated description is omitted here.

The detection unit 38 according to the present exemplary embodiment detects features indicating that regions are continuous from each of the multiple regions acquired by the acquisition unit 30. In the case of the present exemplary embodiment, a text region and an image region are included among the multiple regions. Also, as a feature indicating that regions are continuous, a specific image contained in an image region is applied. The specific image referred to herein is an image expressing a predetermined leader symbol as one example. Note that examples of leader symbols include " . . . " (three-point leader), ". ." (two-point leader), and the like. Leader symbols are a type of punctuation mark, and are used to join character strings to each other, similarly to the delimiter characters above. Leaders symbols are a linear arrangement of a certain number or more (for example, two or more) blobs of black pixels.

In the case in which features are detected by the detection unit 32, the combination unit 40 according to the present exemplary embodiment combines adjacent regions. Specifically, in the case in which text regions are positioned on both the left and right sides of an image region containing a leader symbol, which is one example of a feature, the combination unit 34 combines the image region containing the leader symbol with the text regions on both sides.

Figure 11:
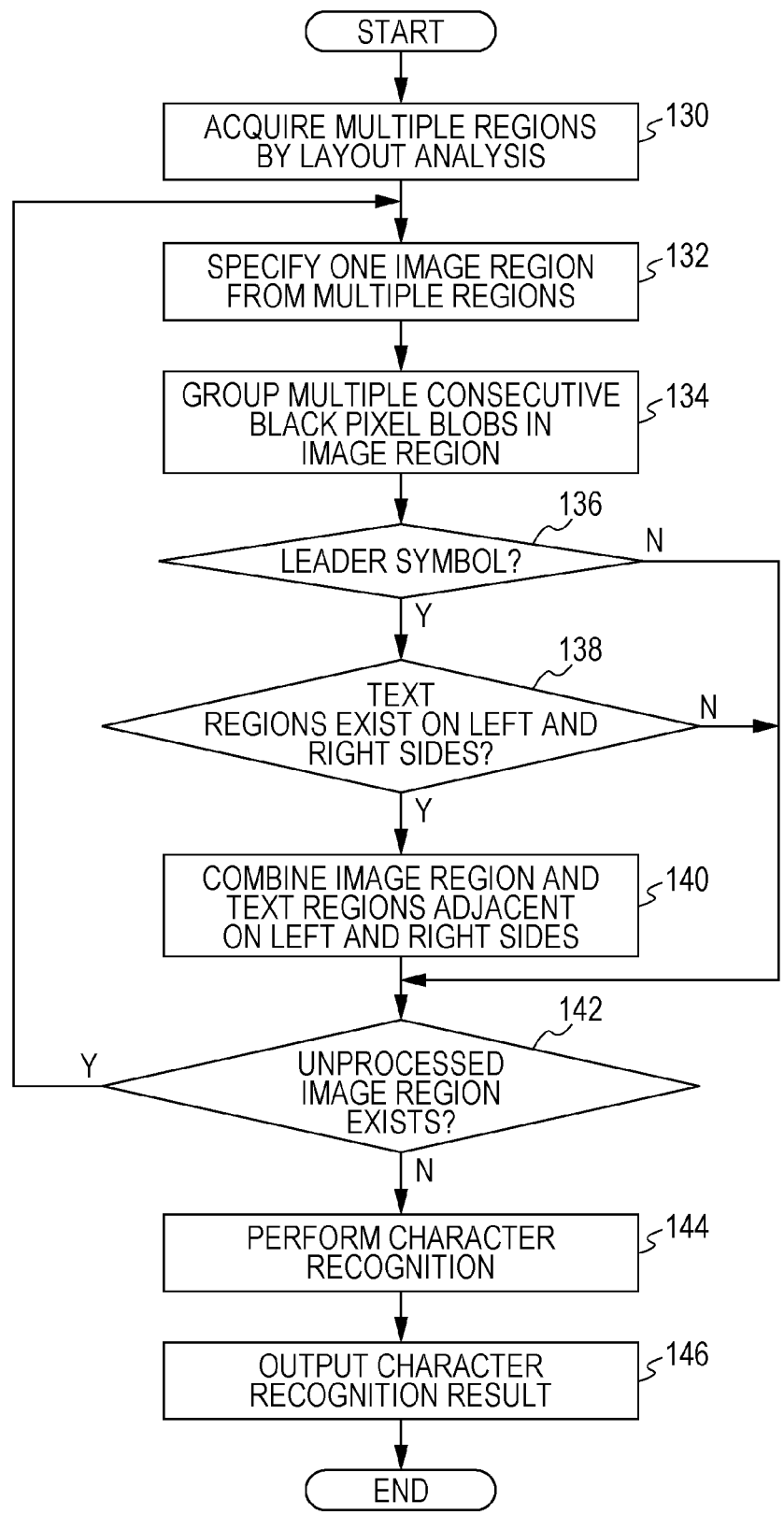
FIG. 11 is a flowchart illustrating one example of the flow of a process by a character recognition processing program according to the second exemplary embodiment.

Next, FIG. 11 will be referenced to describe the action of the image forming device 10B according to the second exemplary embodiment.

FIG. 11 is a flowchart illustrating one example of the flow of a process by the character recognition processing program 14A according to the second exemplary embodiment.

First, if the image forming device 10B is instructed to launch the character recognition processing program 14A, each of the following steps is executed.

Figure 13:
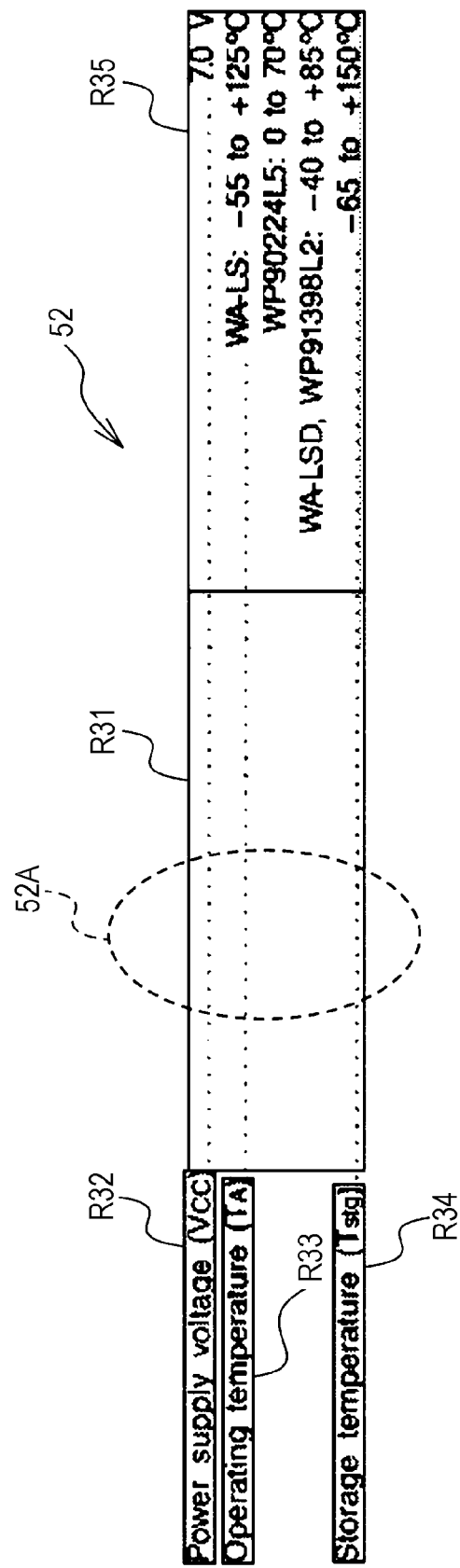
FIG. 13 is a diagram illustrating one example of an image region and multiple text regions obtained as a layout analysis result according to the second exemplary embodiment.

In step 130 of FIG. 11, the acquisition unit 30 acquires multiple regions by performing layout analysis on an input image. As one example, layout analysis is performed on an input image 52 illustrated in FIG. 12, and a layout analysis result including an image region R31 and multiple text regions R32 to R35 illustrated in FIG. 13 is obtained.

FIG. 12 is a diagram illustrating one example of the input image 52 according to the second exemplary embodiment. FIG. 13 is a diagram illustrating one example of the image region R31 and the multiple text regions R32 to R35 obtained as a layout analysis result according to the second exemplary embodiment.

In step 132, the detection unit 38 specifies one image region from among the multiple regions acquired in step 130. As one example, the single image region R31 is specified from the image region R31 and the multiple text regions R32 to R35 illustrated in FIG. 13.

In step 134, the detection unit 38 groups multiple continuous black pixel blobs in the image region specified in step 132. The black pixel blobs are blobs of black pixels smaller than a character (for example, approximately ¼ of a 10-point character). Multiple black pixel blobs arranged in a straight line are grouped and treated as a leader symbol candidate. As one example, multiple black pixel blobs 52A included in the image region R31 illustrated in FIG. 13 are grouped together.

In step 136, the detection unit 38 determines whether or not the multiple black pixel blobs grouped in step 134 are a leader symbol. In the case of determining that the multiple black pixel blobs grouped together are a leader symbol (in the case of a positive determination), the flow proceeds to step 138, whereas in the case of determining that the multiple black pixel blobs grouped together are not a leader symbol (in the case of a negative determination), the flow proceeds to step 142. As one example, the multiple black pixel blobs 52a illustrated in FIG. 13 are determined to be a leader symbol. Note that characteristics such as the number and spacing of the multiple black pixel blobs may also be used in the determination of a leader symbol. For example, in the case in which the number of the multiple black pixel blobs is a certain number or greater (for example, 2 or greater), the multiple black pixel blobs are determined to be a leader symbol, whereas if less than the certain number, the multiple black pixel blobs are not determined to be a leader symbol. Also, in the case in which the spacing of the multiple black pixel blobs is fixed, the multiple black pixel blobs may be determined to be a leader symbol, whereas in the case in which the spacing of the multiple black pixel blobs is not fixed, the multiple black pixel blobs may not be determined to be a leader symbol.

In step 138, the combination unit 40 determines whether or not text regions exist on both the left and right sides of the image region containing the leader symbol. In the case of determining that text regions exists on both the left and right sides of the image region (in the case of a positive determination), the flow proceeds to step 140, whereas in the case of determining that text regions do not exist on both the left and right sides of the image region (in the case of a negative determination), the flow proceeds to step 142.

In step 140, the combination unit 40 combines the image region containing the leader symbol with the text regions adjacent on the both the left and right sides of the image region, and proceeds to step 142. As one example, the image region R31 and the multiple text regions R32 to R35 illustrated in FIG. 13 are combined, and a text region R36 illustrated in FIG. 14 is obtained as the combination result.

FIG. 14 is a diagram illustrating one example of the text region R36 obtained as a combination result according to the second exemplary embodiment.

In step 142, the combination unit 40 determines whether or not an image region not yet processed by the combination process exists. In the case of determining that an unprocessed image region exists (in the case of a positive determination), the flow returns to step 132 and the process is repeated, whereas in the case of determining that an unprocessed image region does not exist (in the case of a negative determination), the flow proceeds to step 144.

In step 144, the recognition unit 36 performs the character recognition process on multiple text regions, including the text region obtained by the above combination process, and acquires a character recognition result.

In step 146, the recognition unit 36 outputs the character recognition result obtained in step 144 to the storage 14 as one example, and ends the series of processes by the character recognition processing program 14A.

Figure 15:
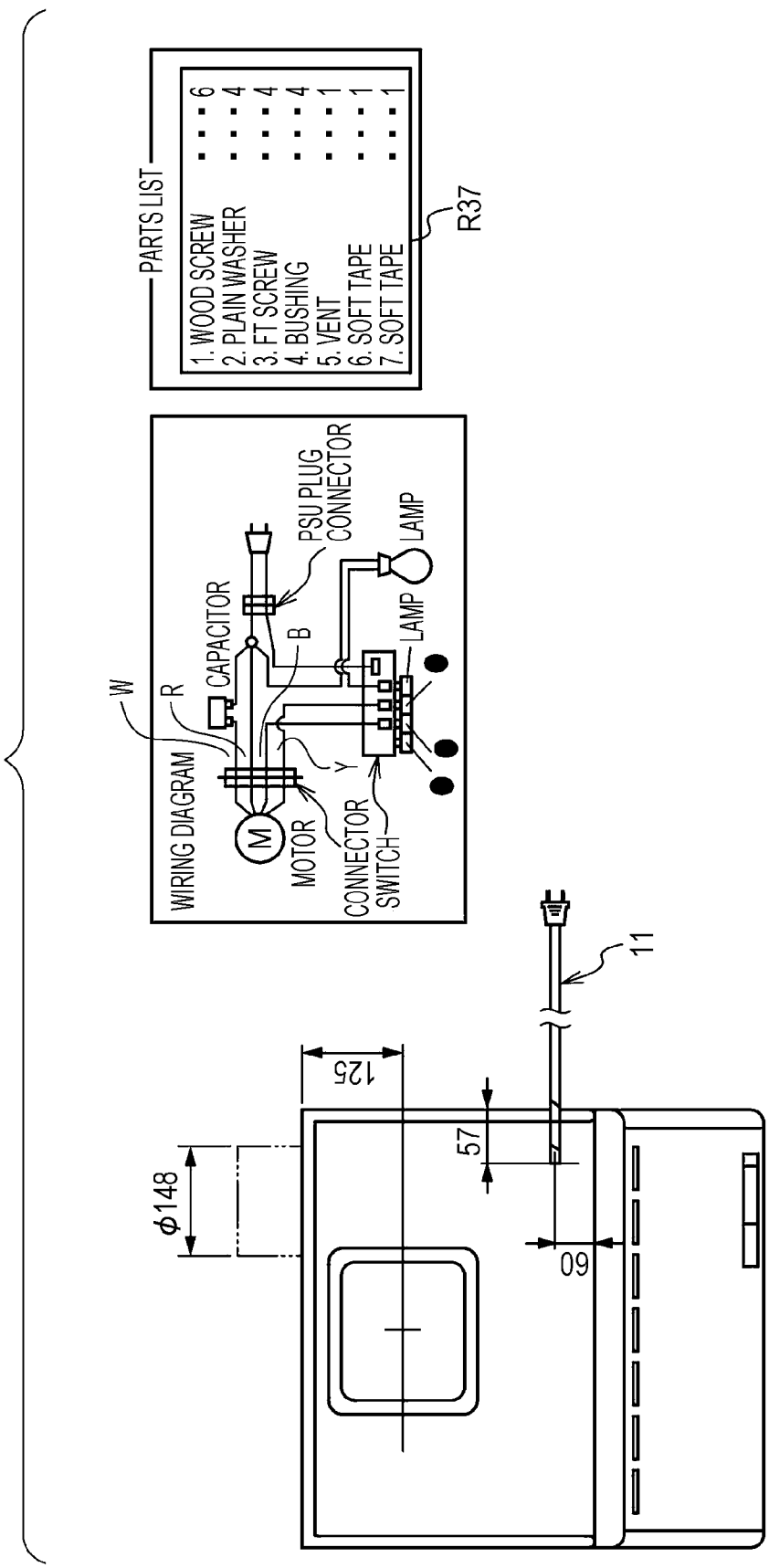
FIG. 15 is a diagram illustrating one example of an image to which the combination process according to the second exemplary embodiment is applied.

FIG. 15 is a diagram illustrating one example of an image to which the combination process according to the second exemplary embodiment is applied. In the case of the image illustrated in FIG. 15, a layout analysis result including a text region R37 is obtained.

In FIG. 15, an image region containing the leader symbol " . . . " exists between a text region containing "1. Wood screw, 2. Plain washer, 3. FT screw, 4. Bushing, 5. Vent, 6. Soft tape, 7. Soft tape" and a text region containing "6, 4, 4, 4, 1, 1, 1". For this reason, the text regions adjacent on both the left and right sides of the image region are combined to obtain the text region R37.

Note that although the above describes the case of using an image expressing a leader symbol as a feature indicating that text regions are continuous, a character code expressing a leader symbol may also be used as the feature. In this case, the detection unit 38 detects a character code expressing a leader symbol by determining whether or not a character code obtained by performing character recognition on a specific image contained in an image region is a code expressing a predetermined leader symbol. The specific image is an image expressing a leader symbol, and the character recognition process is performed by the recognition unit 36. Also, it is beneficial to store a code table to use for character recognition in the storage 14.

Subsequently, in the case in which text regions are positioned on both the left and right sides of an image region containing a character code expressing a leader symbol, the combination unit 40 combines the image region containing the leader symbol with the text regions adjacent on both the left and right sides of the image region.

According to the present exemplary embodiment, a leader symbol contained in an image region is applied as a feature indicating that text regions are continuous. For this reason, a desired combination result is obtained from multiple text regions.

The above description takes an image forming device as one example of the information processing device according to the exemplary embodiments. An exemplary embodiment may also be configured as a program that causes a computer to execute the functions of each component provided in the image forming device. An exemplary embodiment may also be configured as a non-transitory computer-readable storage medium storing the program.

Otherwise, the configuration of the image forming device described in the exemplary embodiments above is an example, and may be modified according to circumstances within a scope that does not depart from the gist.

Also, the process flows of the program described in the exemplary embodiments above is an example, and unnecessary steps may be removed, new steps may be added, or the processing sequence may be rearranged within a scope that does not depart from the gist.

Also, the exemplary embodiments above describe a case in which processes according to the exemplary embodiments are realized by a software configuration using a computer by executing a program, but the configuration is not limited thereto. An exemplary embodiment may also be realized by a hardware configuration, or by a combination of a hardware configuration and a software configuration, for example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor, configured to:
perform layout analysis on an input image and acquire a plurality of regions from the input image, wherein the plurality of regions comprise a plurality of text regions;
detect a feature from each of the plurality of text regions, wherein the feature is in a first text region, and wherein the feature indicates that at least two of the plurality of text regions are continuous, and the feature is a character code obtained by performing character recognition on a specific image positioned at a beginning or an end of a text line contained in the first text region;
combine the first text region with an adjacent text region adjacent to the first text region to generate a combined region; and
perform character recognition on the combined region to obtain a character recognition result.

2. The information processing device according to claim 1, wherein
in a case in which the specific image is positioned at the beginning of the text line, the processor combines the first text region containing the specific image with a text region adjacent to a left edge of the first text region containing the specific image, and
in a case in which the specific image is positioned at the end of the text line, the processor combines the text region containing the specific image with a text region adjacent to a right edge of the first text region containing the specific image.

3. The information processing device according to claim 2, wherein
the specific image is an image expressing a predetermined delimiter character.

4. The information processing device according to claim 1, wherein
the specific image is an image expressing a predetermined delimiter character.

5. The information processing device according to claim 1, wherein the specific image is included in the first text region.

6. The information processing apparatus according to claim 1, wherein
in a case in which the character code is positioned at the beginning of the text line, the processor combines the first text region containing the character code with a text region adjacent to a left edge of the first text region containing the character code, and
in a case in which the character code is positioned at the end of the text line, the processor combines the text region containing the character code with a text region adjacent to a right edge of the first text region containing the character code.

7. The information processing device according to claim 6, wherein
the character code is a code expressing a predetermined delimiter character.

8. The information processing device according to claim 1, wherein
the character code is a code expressing a predetermined delimiter character.

9. The information processing device according to claim 1, wherein the plurality of regions include an image region other than the plurality of text regions, and
the specific image is contained in the image region.

10. The information processing device according to claim 9, wherein
in a case in which two text regions are positioned on both a left and a right side of the image region containing the specific image, the processor combines the image region with the two text regions on both the left and right sides.

11. The information processing device according to claim 10, wherein
the specific image is an image expressing a predetermined leader symbol.

12. The information processing device according to claim 10, wherein
the character code is a code expressing a predetermined leader symbol.

13. The information processing device according to claim 9, wherein
the specific image is an image expressing a predetermined leader symbol.

14. The information processing device according to claim 9, wherein
the character code is a code expressing a predetermined leader symbol.

15. A non-transitory computer readable medium storing a program causing a computer to execute a process for functioning as the information processing device according to claim 1.

\* \* \* \* \*